United States Patent
Peng

(10) Patent No.: US 8,060,512 B2
(45) Date of Patent: Nov. 15, 2011

(54) HYBRID TENSOR-BASED CLUSTER ANALYSIS

(75) Inventor: Wei Peng, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 287 days.

(21) Appl. No.: 12/479,392

(22) Filed: Jun. 5, 2009

(65) Prior Publication Data

US 2010/0312797 A1    Dec. 9, 2010

(51) Int. Cl.
*G06F 7/00* (2006.01)
*G06F 17/30* (2006.01)

(52) U.S. Cl. .......................................... 707/737; 706/48

(58) Field of Classification Search .................. 707/737
See application file for complete search history.

(56) References Cited

U.S. PATENT DOCUMENTS

| | | | |
|---|---|---|---|
| 5,857,179 A * | 1/1999 | Vaithyanathan et al. ............. | 1/1 |
| 6,389,436 B1 * | 5/2002 | Chakrabarti et al. .......... | 715/229 |
| 6,397,166 B1 * | 5/2002 | Leung et al. .................. | 702/179 |
| 6,505,184 B1 * | 1/2003 | Reed et al. ...................... | 706/47 |
| 6,533,882 B1 * | 3/2003 | Woodside ...................... | 156/166 |
| 7,720,848 B2 * | 5/2010 | Guerraz et al. ................ | 707/737 |
| 2004/0068697 A1 * | 4/2004 | Harik et al. ..................... | 715/513 |
| 2006/0041590 A1 * | 2/2006 | King et al. ................. | 707/104.1 |
| 2006/0190241 A1 * | 8/2006 | Goutte et al. ..................... | 704/2 |
| 2008/0010038 A1 * | 1/2008 | Smaragdis et al. ........... | 702/181 |
| 2009/0132901 A1 * | 5/2009 | Zhu et al. ....................... | 715/206 |
| 2009/0299705 A1 * | 12/2009 | Chi et al. .......................... | 703/2 |

OTHER PUBLICATIONS

D. Cohn and T. Hofmann, "The Missing Link—A Probabilistic Model of Document Content and Hypertext Connectivity", 2001, Advances in Neural Information Processing Systems 13, MIT Press, pp. 430-436.*

Wei Xu, Xin Liu, Yihong Gong Document Clustering Based on Non-negative Matrix Factorization SIGIR '03 Proceedings of the 26th annual international ACM SIGIR conference on Research and development in informaion retrieval.*

David Cohn, Huan Chang "Learning to Probabilistically Identify Authoritative Documents" 2000 Learning-International Workshop www.psu.edu.*

Ben Taskar, Eran Segal, Daphne Koller Probabilistic classification and clustering in relational data 2001 www.psu.edu.*

Acar, et al., "Unsupervised Multiway Data Analysis: A Literature Survey," 15 pages.

(Continued)

*Primary Examiner* — Neveen Abel Jalil
*Assistant Examiner* — Polina Peach
(74) *Attorney, Agent, or Firm* — Philip E. Blair; Fleit Gibbons Gutman Bongini & Bianco P.L.

(57) ABSTRACT

What is disclosed is a novel system and method for analyzing multi-dimensional cluster data sets to identify clusters of related documents in an electronic document storage system. Digital documents, for which multi-dimensional probabilistic relationships are to be determined, are received and then parsed to identify multi-dimensional count data with at least three dimensions. Multi-dimensional tensors representing the count data and estimated cluster membership probabilities are created. The tensors are then iteratively processed using a first and a complementary second tensor factorization model to refine the cluster definition matrices until a convergence criteria has been satisfied. Likely cluster memberships for the count data are determined based upon the refinements made to the cluster definition matrices by the alternating tensor factorization models. The present method advantageously extends to the field of tensor analysis a combination of Non-negative Matrix Factorization and Probabilistic Latent Semantic Analysis to decompose non-negative data.

19 Claims, 3 Drawing Sheets

OTHER PUBLICATIONS

Kolda, et al., "The TOPHITS Model for Higher-Order Web Link Analysis," 12 pages.

Wang, et al., "Rank-R Approximation of Tensors Using Image-as-Matrix Representation," 8 pages.

Shashanka, et al., "Probabilistic Latent Variable Models as Non-Negative Factorizations," 7 pages.

Ding, et al., "Orthogonal Nonnegative Matrix Tri-Factorizations for Clustering," 10 pages.

Ding, et al., "On the Equivalence Between Nonnegative Matrix Factorization and Probabilistic Latent Semantic Indexing," pp. 1-19.

Acar, et al., "Modeling and Multiway Analysis of Chatroom Tensors," 13 pages.

Farahat, et al., "Improving Probabilistic Latent Semantic Analysis with Principal Component Analysis, " pp. 105-112.

Wang, et al., "Compact Representation of Multidimensional Data Using Tensor Rank-One Decomposition," 4 pages.

Lee, et al., "Algorithms for Non-negative Matrix Factorization," 7 pages.

Sun, et al., "CubeSVD: A Novel Approach to Personalized Web Search," © International World Wide Web Conference Committee (IW3C2), *WWW 2005*, May 10-14, 2005, pp. 382-390, Chiba, Japan, ACM1-59593-046-9/09/05/0005.

Vichi, J., "Clustering and data reduction models for three-way preference data," University of Rome "La Sapienza", Dep. Statistics, Probability and Applied Statistics, P.le A. Moro 5, I-00185, Rome, Italy (Session 3 (invited lecture): S3-1), 2 pages.

Li, T., "A Unified View on Clustering Binary Data," Florida International University, School of Computer Science, Sep. 30, 2005, pp. 1-25.

Hofmann, T., "Unsupervised Learning by Probabilistic Latent Semantic Analysis," Machine Learning, 42, pp. 177-196, 2001, © 2001 Kluwer Academic Publishers, Manufactured in The Netherlands.

Huang, et al., "Simultaneous Tensor Subspace Selection and Clustering: The Equivalence of High Order SVD and K-Means Clustering," *KDD '08*, Aug. 24-27, 2008, Las Vegas, Nevada, USA, © 2008 ACM 978-1-60558-193-4/08/08, pp. 327-335.

Bader, et al., "Temporal analysis of semantic graphs using ASALSAN," *Seventh IEEE International Conference on Data Mining*, 1550-4786/07, © 2007 IEEE, DOI 10.1109/ICDM.2007.54, pp. 33-42.

Chi, et al., "Probabilistic Polyadic Factorization and Its Application to Personalized Recommendation," CIKM'08, Oct. 26-30, 2008, Napa Valley, California, USA, © 2008 ACM 978-1-59593-991-3/08/10, pp. 941-950.

Hofmann, T., "Probabilistic Latent Semantic Indexing," *Proceedings of the Twenty-Second Annual International SIGIR Conference on Research and Development in Information Retrieval*, 1999, 8 pages.

Hofmann, T., "Probabilistic Latent Semantic Indexing (Powerpoint Presentation)," *Proceedings of the Twenty-Second Annual International SIGIR Conference on Research and Development in Information Retrieval*, 1999, 12 pages.

Kolda, T., "Orthogonal Tensor Decompositions," *Siam J. Matrix Anal. Appl.*, vol. 23, No. 1, pp. 243-255, © 2001 Society for Industrial and Applied Mathematics.

Ding, et al., "Posterior Probabilistic Clustering using NMF," SIGIR'08, Jul. 20-24, 2008, Singapore, ACM 978-1-60558-164-4/08/07 pp. 831-832.

Shashua, et al., "Non-Negative Tensor Factorization with Applications to Statistics and Computer Vision," *Proceedings of the $22^{nd}$ International Conference on Machine Learning*, Bonn, Germany, 2005, 8 pages.

Vasilescu, et al., "Multilinear Analysis of Image Ensembles: TensorFaces," *Proc. of the European Conf. on Computer Vision (ECCV '02)*, Copenhagen, Denmark, May 2002, pp. 447-460.

Ding, et al., "Nonnegative Matrix Factorization and Probabilistic Latent Semantic Indexing: Equivalence, Chi-square Statistic, and a Hybrid Method," © 2006, American Association for Artificial Intelligence (www.aaai.org), 6 pages.

Vasilescu, et al., "Multilinear Subspace Analysis of Image Ensembles," *Proceedings of the IEEE Conference on Computer Vision and Pattern Recognition (CVPR '03)*, Madison, WI, Jun. 2003, vol. 2, pp. 93-99.

Lee, et al., "Learning the parts of objects by non-negative matrix factorization," *Nature*, vol. 401, Oct. 21, 1999, www.nature.com, pp. 788-791, © 1999 Macmillan Magazines Ltd.

Harshman, R., "Foundations of the Parafac Procedure: Models and Conditions for an "Explanatory" Multimodal Factor Analysis," *UCLA Working Papers in Phonetics*, 16, pp. 1-84, University Microfilms, Ann Arbor, Michigan No. 10,085.

Schwarz, G., "Estimating the Dimension of a Model," *The Annals of Statistics*, vol. 6, No. 2 (Mar. 1978), pp. 461-464.

Strehl, et al., "Cluster Ensembles—A Knowledge Reuse Framework for Combining Multiple Partitions," *Journal of Machine Learning Research 3* (2002, pp. 583-617.

Martin, et al., "A Jacobi-Type Method for Computing Orthogonal Tensor Decompositions," ISIAM J. Matrix Anal. Appl.I, vol. 30, No. 3, pp. 1219-1232.

\* cited by examiner

HYBRID TENSOR-BASED CLUSTER ANALYSIS

TECHNICAL FIELD

The present invention is directed to systems and methods for identifying and analyzing multi-dimensional data sets to identify clusters of related documents in an electronic document storage system.

BACKGROUND

Decomposing multi-way, non-negative data is currently a field of much interest and study due to their intrinsic rich structures and natural appearance in many real-world datasets. In document clustering, the data can be represented as a three-way dataset as author×terms×time. In email communications, the data can be represented as sender×receiver×time. In web page personalization, the data can be represented as user×query word×webpage. In high-order web link analysis, the data can be represented as a three-way dataset as web page×web page×anchor text. Instead of performing a traditional matrix decomposition by unwrapping the tensor into multiple two-dimensional matrices, which assumes only pairwise relationships between two dimensions, tensor decomposition methods consider the more complex relationships that exist among all of the multiple dimensions.

Non-negative Matrix Factorization (NMF) techniques, developed for applications in linear algebra, are mainly used in pattern recognition and dimensionality reduction. It performs singular value decomposition with non-negative constraints. The NMF fitting algorithm minimizes the Euclidean distance (the least square error) or DL-divergence (I-divergence) between the original matrix and the reconstructed matrix by using multiplicative update rules to ensure the non-negativity. Probabilistic Latent Semantic Analysis (PLSA), as has been developed for statistics, to decompose non-negative data, uses latent class models or aspect models to perform a probabilistic mixture decomposition. PLSA is often used in natural language processing, information retrieval, and text mining related areas. NMF and PLSA can be naturally extended on multi-way non-negative data, called Non-negative Tensor Factorization (NTF) and Tensorial Probabilistic Latent Semantic Analysis (T-PLSA) respectively. NTF and T-PLSA are multi-dimensional tensor factorization techniques that can be applied to tensor decomposition. NTF and T-PLSA analysis techniques each have different advantages and costs. Designers of multi-dimensional cluster identification processing systems and methods often have to choose one analysis technique over the other and accept the inherent tradeoffs.

Accordingly, what is needed in this art are increasingly sophisticated systems and methods for identifying clusters within data sets based upon multi-dimensional relationships and for analyzing the probabilistic relationships between documents and document content.

BRIEF SUMMARY

What is disclosed is a novel system and method for analyzing multi-dimensional cluster data sets to identify clusters of probabilistically related data in documents contained within an electronic document storage system. Digital documents, for which multi-dimensional probabilistic relationships are to be determined, are parsed to identify multi-dimensional count data with at least three dimensions. Multi-dimensional tensors representing the count data and estimated cluster membership probabilities are created and iteratively processed until a convergence criteria is satisfied. The tensors are alternately processed using a first and a complementary second tensor factorization model to refine the cluster definition matrices. Likely cluster memberships for the count data are determined based upon the refinements made to the cluster definition matrices. The present method advantageously extends to the field of tensor analysis a combination of Non-negative Matrix Factorization (NMF) and Probabilistic Latent Semantic Analysis (PLSA) to decompose non-negative data.

In one example embodiment, the system and method include receiving, from an electronic document storage system, a plurality of digital documents for which multi-dimensional probabilistic relationships are to be determined. The plurality of digital documents are parsed to identify multi-dimensional count data within each of the documents. The multi-dimensional count data includes at least three dimensions with each dimension including a respective data class. A data set is produced which includes at least a three dimensional tensor representing the multi-dimensional count data. For each dimension of the multi-dimensional count data, a cluster definition matrix where each entry is an estimated cluster membership probability of an element is defined. The estimated cluster membership probability indicates a probability of membership of each element in a respective data cluster. The cluster definition matrices are initialized randomly. A pre-defined convergence criteria is set for iterative cluster definition refinement processing. Thereafter, the cluster definition matrices are iteratively processed, in a manner which is described herein in further detail, until the convergence criteria has been satisfied. The iteratively processing includes processing the data set and the cluster definition matrices using a first tensor factorization model of a first tensor factorization technique to produce an updated cluster definition matrices. The data set and the updated cluster definition matrices are iteratively processed using a second tensor factorization model of a second tensor factorization technique to refine the updated cluster definition matrices. These two tensor factorization models are alternatively used to refine the decomposition results of each other. Cluster membership is thereby determined for the multi-dimensional count data within the data set based upon refinements made to the cluster definition matrices. A likely cluster membership includes an indicator of membership of an element of the multi-dimensional count data in a respective cluster. Thereafter, the likely cluster membership results are provided as an output. Various embodiments have been disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
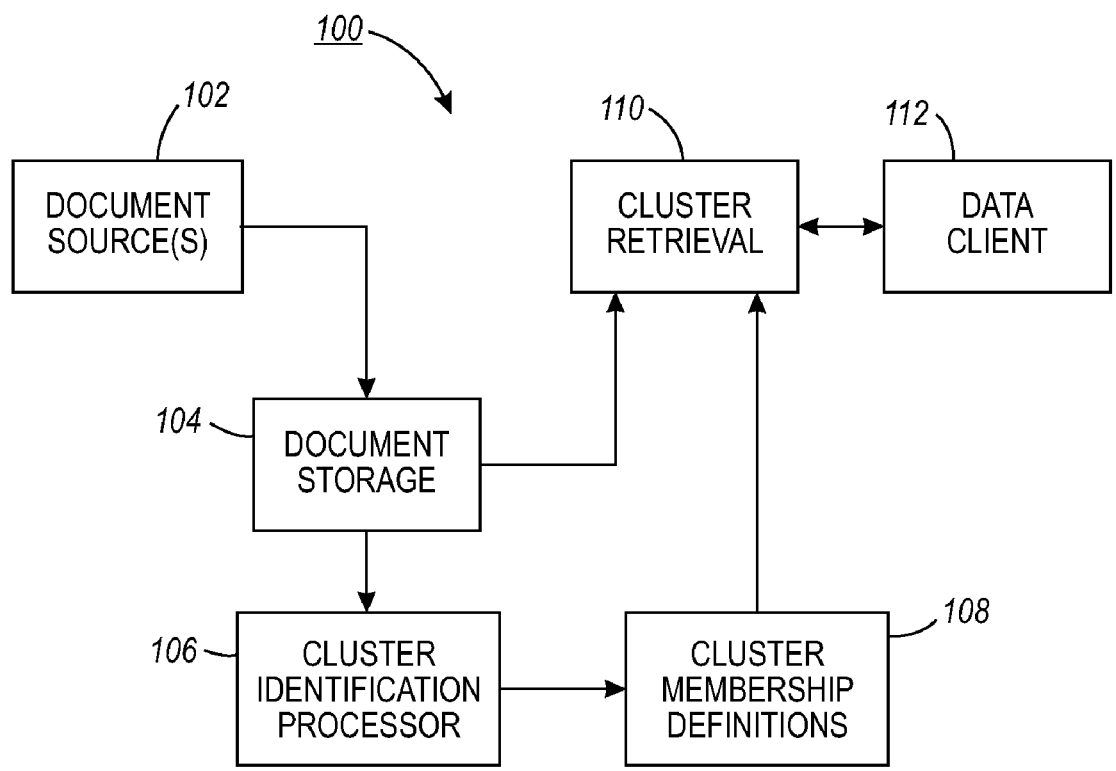
FIG. 1 illustrates a data flow diagram of one embodiment of the present hybrid tensor-based cluster analysis method.

What is disclosed is a novel system and method system and method for analyzing multi-dimensional data sets to identify clusters of related documents in an electronic document storage system. The present method utilizes non-negative data analysis techniques, such as non-negative data decomposition, to perform data clustering analysis.

It should be understood that one of ordinary skill in this art should be readily familiar with the advanced mathematical techniques employed herein, particularly those which directly relate to linear algebra, matrix math, tensors, and processing of data collections to identify related multi-dimensional data clusters. One of ordinary skill would also be knowledgeable about computer science, and software and hardware programming systems and methods sufficient to implement the functionality and capabilities described herein in their own document system environments without undue experimentation.

DEFINITIONS

A "data set" as used herein includes a collection of data that has been prepared for analysis and that will be the subject of analytical processing. An example of a data set includes a multi-dimensional tensor populated with multi-dimensional count data, as defined below, that was parsed from electronic documents.

"Non-negative data" refers to matrixes with all entries having values that are all equal to zero or greater. Matrixes with all non-negative entries support a subset of linear algebra equations useful for factorization.

"Multi-dimensional count data" includes data contained within a data set that corresponds to items of interest in the data set. An example of multi-dimensional count data for a number of e-mails includes a three-dimensional set of count data such as, for example, sender, receiver, and time.

A "data class" refers to a description of a relationship of data to a data set. For example, a data class can include metadata that is data describing the data set, or a data class can be text that is within a component of the data set, such as text within a document.

An "electronic document storage system" refers to a data storage system used to store electronic documents. An electronic document storage system includes a data base maintained by a computer system, workstation, or server, that is either remote from or collocated with a device hosting a computing process that accesses and/or stores documents within the electronic document storage system. An electronic document storage system includes electronic document storage systems that are used for multiple consumers and/or sources of electronic documents. A cluster analysis system employing various aspects of the present hybrid tensor-based cluster analysis method would access data within that electronic document storage system. An electronic document storage system may also be dedicated to a cluster identification system and electronic documents to be analyzed are transferred into the electronic document storage system.

A "multi-dimensional count data", as used herein, includes at least three dimensions with each dimension associated with a respective data class that includes either one or both of metadata associated with a respective document and text within the document.

A "multi-dimensional probabilistic relationship" refers to one or more probability values assigned to each relationship of a data item within multi-dimensional count data to each identified cluster.

A "non-negative three dimensional tensor" is a three dimensional array used to store data of three data classes, where each dimension of the three dimensional array relates to one of the three data classes.

"Cluster definition matrices" refer to matrices each of which defines clusters to which elements of a particular dimension (document dimension, word dimension, etc.) are likely to belong.

An "estimated cluster membership probability" for a particular document to a particular cluster within a number of clusters refers to a probability that the particular document is a member of the particular cluster. In one embodiment, an estimated cluster membership probability for a particular document in a particular cluster is determined based on similarities between the count data of the particular document and count data of other documents in the particular cluster relative to similarities of the count data of the particular document to count data of documents in other clusters.

A "likely cluster membership" refers to a probability determination that a particular document is most likely to belong to a specified cluster. In one embodiment, a likely cluster membership indicates that a determination is made that the particular document is most likely to be more similar to other documents in that specified cluster than to documents that are members of other clusters.

"Initial cluster definition matrices" refers to tensors that contain initial cluster membership probabilities for each element of an estimated cluster membership probability. The initial cluster definition matrices are used as an initial cluster membership estimate for iterations of tensor processing that will iteratively converge on determined estimated cluster definition matrices. The initial cluster definition matrices are able to have, for example, random values assigned to each element.

"Outputting of the likely cluster membership" refers to providing a definition of likely cluster memberships to either another computing process or to a user display. Outputting of the likely cluster membership in one embodiment is able to be accomplished by, for example, providing a matrix or similar data structure to another computing process, such as an electronic database, a data mining computing system, or other suitable system able to accept and process cluster membership data. Outputting of the likely cluster membership is also able to include providing any representation of cluster membership information for electronic documents on a display for a user to interpret. A display for a user of likely cluster membership includes, for example, graphical representations of cluster memberships for each electronic document, statistical representations of cluster memberships for the set of electronic documents being processed, and other representations to a user of membership of electronic documents to clusters.

A "NParafac Factorization Model" is a non-negative parallel factor analysis tensor factorization model that can be thought as a multi-linear form of decomposition for the objective tensor: each entry of the three-way tensor is approximated by a linear combination of three vectors.

A "ParaAspect Factorization Model" is a tensor latent class model that corresponds to the NParafac Factorization Model. The ParaAspect Factorization Model performs probabilistic mixture decomposition wherein a log-likelihood of a latent class model is maximized by an Expectation Maximization algorithm.

A "NTucker3 Tensor Decomposition Model" is a non-negative Tucker model, as known in this art, that can be thought of as multi-way principle component analysis. The NTucker3 Tensor Decomposition Model provides an optimal low rank approximation of a tensor with a given number of dimensions.

A "TuckAspect Tensor Decomposition Model" is a tensor latent class model that corresponds to the NTucker3 Factorization Model.

One embodiment hereof utilizes one of two models of the Tensorial Probabilistic Latent Semantic Analysis (T-PLSA) technique and one of two model types of the Non-negative Tensor Factorization (NTF) technique to perform cluster analysis. For the T-PLSA technique, the two models used herein are referred to as "ParaAspect" and "TuckAspect." The "Para" part of the model name is from Parafac. The "Tuck" part of the model name is taken from the "Tucker3" model. The "Aspect" part of the name references the "Aspect" model. For the NTF technique, the non-negative Parafac (NParafac) model and non-negative Tucker3 (NTucker) model are used.

Example Embodiment

Reference is now made to FIG. 1 which illustrates a data flow diagram 100 of one embodiment hereof. The data flow diagram 100 illustrates a document storage 104 which receives and stores various electronic documents from document source(s) 102. Document storage 104 is implemented in one embodiment as a conventional data base system of documents. The data flow diagram further illustrates a cluster identification processor 106 that, in one embodiment, implements the cluster identification processing described above and further discussed below. The cluster identification processor of one embodiment produces likely cluster membership data for the electronic documents stored in the document storage 104. The likely cluster definitions produced by the cluster identification processor are stored in the cluster membership definitions 108. Cluster membership definitions in one embodiment are stored in a data base system. A cluster retrieval processor 110 of one embodiment is in bi-directional communications with a data client 112. Data client of various embodiments is able to be one or more of a data terminal, a data processing system, or any suitable processing system or user interface. The data client produces a request for documents or other data that has been determined to be part of a data cluster. Data client submits a request to the cluster retrieval processor for documents or data that are in a requested cluster. The cluster retrieval processor retrieves data from the cluster membership definitions and, based on the retrieved cluster membership data, retrieves the documents or data that are members of the requested cluster from the document storage.

Example Flow Diagram

Figure 2:
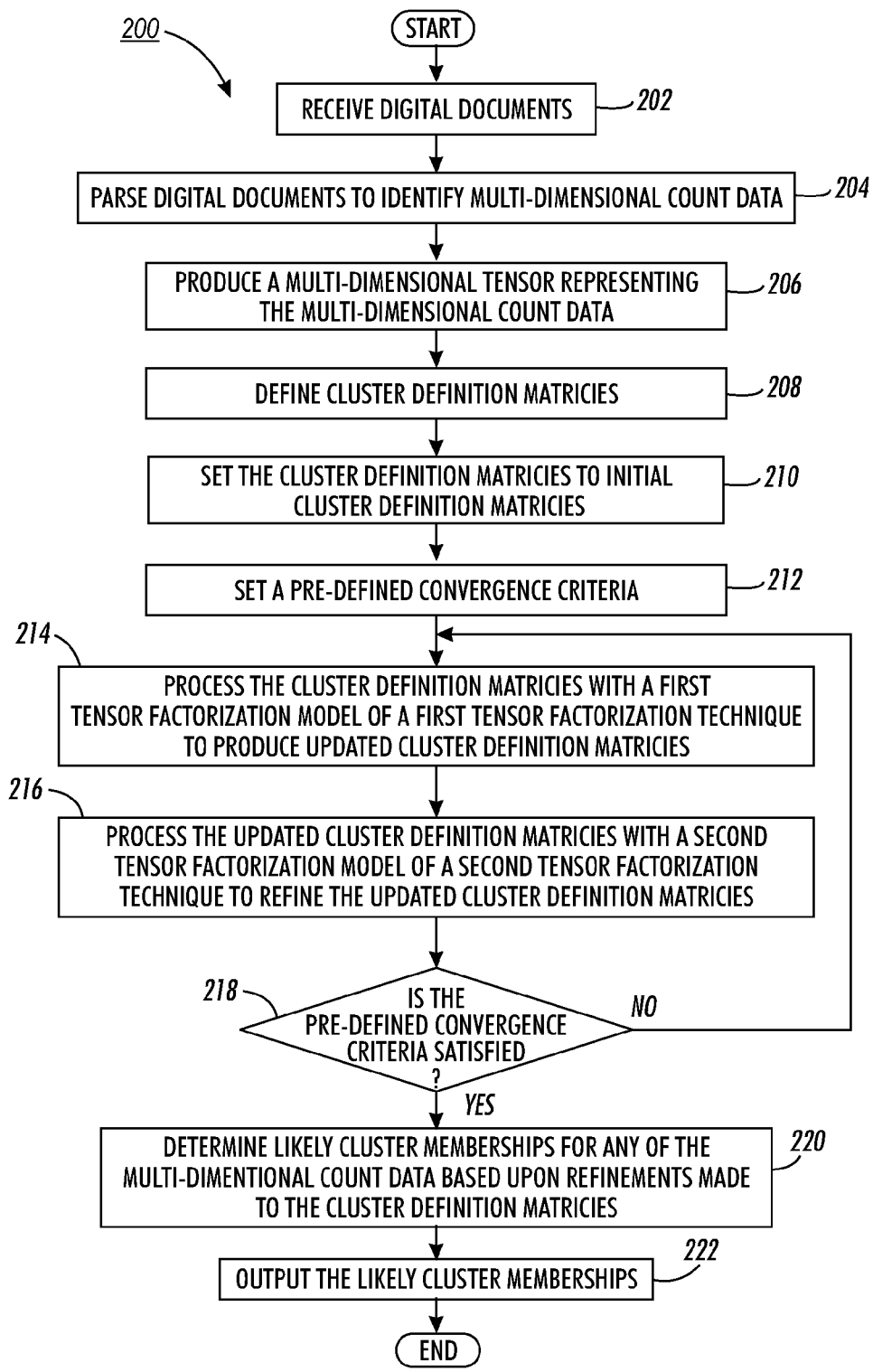
FIG. 2 illustrates a processing flow diagram of one embodiment of the present method.

Reference is now made to FIG. 2, which illustrates a processing flow 200 diagram of one embodiment of the present method.

At 202, a plurality of digital documents for which multi-dimensional probabilistic relationships are to be determined is received from an electronic document storage system. In various embodiments, these digital documents are able to be, for example, publications, pages of web sites retrieved from the World Wide Web, or any electronic document. Publications are able to include, for example, academic papers, news articles, and the like. In one embodiment, the system and method also scan, prior to the receiving, a plurality of printed documents into the electronic document storage system. In one embodiment, the present system and method further crawls, prior to receiving, a plurality of electronic documents available over a computer network, and stores, again prior to receiving, the plurality of electronic documents into the electronic document storage system.

At 204, the plurality of digital documents are parsed to identify multi-dimensional count data within each of the plurality of digital documents. In one embodiment, parsing the plurality of digital documents to identify multi-dimensional count data within each of the digital documents includes performing one of data mining and text mining on each digital document within the plurality of digital documents.

At 206, a data set is produced which includes at least a three dimensional tensor representing the multi-dimensional count data. In one embodiment, producing a data set which includes at least a three dimensional tensor representing the multi-dimensional count data includes categorizing the multi-dimensional count data into at least three categories, and populating the at least three dimensional tensor within the data set with the multi-dimensional count data. Each category within the at least three categories populates a respective dimension of the at least three dimensional tensor within the data set. In one embodiment that processes the three dimensional data parsed from academic papers would produce a three dimensional tensor that is stored in a computer memory with each of the three dimensions described above, such as: 1) author, 2) term, and 3) publication date. A similar three dimensional tensor for processing e-mail messages would be produced with a dimension for each of 1) sender's name, 2) receiver's name, and 3) date.

At 208, cluster definition matrices are defined that contain an estimated cluster membership probability of each element of each dimension of the multi-dimensional count data within the data set. The estimated cluster membership probability indicates a probability of membership of each element in a respective data cluster. In one embodiment, clusters are defined as groups of data elements where all data elements that are members of a particular cluster have been determined to be similar to one another. In one embodiment, a particular data element is determined to be a member of a particular cluster when a determination is made that the particular data element is most likely to be more similar to other documents in that particular cluster than to data elements in other clusters.

At 210, the cluster definition matrices are set to initial cluster definition matrices. In one embodiment, the initial cluster definition matrices are set to random entry values for the data set.

At 212, pre-defined convergence criteria is set for the iterative cluster definition refinement processing. In one embodiment, the pre-defined convergence criteria include a maximum amount by which a value of an objective function for a factorization model decreases after the pair of factorization models process the cluster member ship data. If the objective function decreases by an amount less than the specified maximum amount, the processing is declared to have converged and the convergence criteria is declared to be satisfied.

The processing flow proceeds by iteratively processing the cluster definition matrices until the convergence criteria have been satisfied. In one embodiment, the iterative processing includes first processing, at 214, the data set and the cluster definition matrices using a first tensor factorization model of a first tensor factorization technique to produce updated cluster definition matrices. Examples of the first tensor factorization model include, for example, the NParafac Factorization Model or the NTucker3 Tensor Decomposition Model.

The iterative processing then includes processing, at 216, the data set and the updated cluster definition matrices using a second tensor factorization model of a second tensor factorization technique to refine the updated cluster definition matrices. The second factorization model of the other technique is executed on the previously obtained solution based upon the local minimum of the first model. These two models of the NTF and the T-PLSA techniques are alternated to operate on the solution of the previous iteration of the other model to help jump out the respective local minima of each technique. This iteration is performed until convergence, such as reducing a metric value below a pre-determined threshold. Examples of the second tensor factorization model include, for example, the ParaAspect Factorization model when the first tensor factorization model is the NParafac Factorization Model, or the TuckAspect Tensor Decomposition Model when the first tensor factorization model is the NTucker3 Tensor Decomposition Model. One embodiment of the present method uses a hybrid T-PLSA-NTF algorithm. Another uses a single algorithm that, for example, executes a model of either the NTF technique or the T-PLSA technique until convergence on a local minimum for that particular model.

Consecutive iterations of the complementary factorization methods of the alternating T-PLSA and NTF techniques lowers the objective function value relative to its initial value for each iteration. This consecutive lowering of the objective function values causes the alternating iterative process to yield monotonic decreases and therefore causes the hybrid T-PLSA-NTF algorithm to reliably converge. The cluster identification performance of this hybrid algorithm is improved over the clustering performance of using only one model of either the NTF technique or T-PLSA technique alone since the alternating of techniques moves solutions away from the local minima of a single technique to more likely find a global minimum for the solution.

After processing the data set with these two alternating complementary processing steps, at 218, a determination is made whether the pre-defined convergence criteria has been satisfied. If the pre-defined convergence criteria has not been satisfied, flow returns to processing the cluster definition matrices, which have been refined by the processing, at 216, with the first tensor factorization model. If the pre-defined convergence criteria have been satisfied, processing continues by determining, at 220, at least one likely cluster membership for any of the multi-dimensional count data within the data set based upon the refinements made to the cluster definition matrices. In this context, a likely cluster membership includes an indicator of membership of an element of the multi-dimensional count data in a respective cluster. In another embodiment, the step of determining at least one likely cluster membership for any of the multi-dimensional count data within the data set based upon refinements made to the cluster definition matrices includes determining a highest probability of cluster membership for the any of the multi-dimensional count data.

At 222, at least one likely cluster membership is output. In various embodiments, likely cluster memberships for only a subset of electronic documents or for all electronic documents begin processed is output. Likely cluster memberships are able to be output in any suitable form that specifies, for each electronic document, a cluster to which that document most likely belongs. For example, a likely cluster membership is able to include a matrix with one row for each electronic document and each row contains two columns. One of these two columns contains an indication of a particular electronic document and the other column contains a specification of a cluster to which that particular electronic document is most likely to belong. Outputting of the likely cluster membership in one embodiment includes providing such a matrix to another computing process, such as an electronic database, a data mining computing system, or other suitable system able to accept and process cluster membership data. Outputting of the likely cluster membership is also able to include providing any representation of cluster membership information for electronic documents on a display for a user to interpret. A display for a user of likely cluster membership includes, for example, graphical representations of cluster memberships for each electronic document, statistical representations of cluster memberships for the set of electronic documents being processed, and other representations to a user of membership of electronic documents to clusters. Thereafter, processing stop.

Factorization Models and Techniques

The following description describes a previously unproven scenario that the ParaAspect model (with DL-divergence objective function) can be used as a complementary model of the NParafac model, and that the TuckAspect model (with DL-divergence objective function) can be used as a complementary model of the NTucker model because they all optimize the same objective functions. In addition, the factorization of nonnegative Parafac and Tucker3 with column L1-normalization is equivalent and complementary to that of ParaAspect and TuckAspect, respectively. These complementary models, however use different optimization algorithms and therefore are likely to have different optimization trajectories with different respective local minima.

Due to different optimization procedures, the ParaAspect model and the NParafac model, the TuckAspect model and the NTucker model converge to different local minima even though they optimize the same objective functions. One embodiment utilizes these characteristics of these different models by alternating between corresponding models of the NTF technique and the T-PLSA technique. By alternating between corresponding models of different decomposition techniques, the decomposition solutions are able to effectively "jump out of" each other's local minima and thus achieve a better solution towards reaching a global minimum of the objective function.

The following uses an example with a non-negative, two dimensional matrix identified as F with entries denoted as $f_{ij}$ where i and j represent row/column indices. In an example involving document clustering, the matrix F is viewed as a document-word co-occurrence matrix.

The NMF Factorization Model is given as: Matrix $F \approx CH^T$, with $c_{ij} \geq 0$ and $h_{ij} \geq 0$. The PLSA latent variable model is: $f_{ij} \approx P(w_i, d_j) = \Sigma_k P(w_i|z_k) P(d_j|z_k) P(z_k)$, where $P(w_i, d_j)$ represents the joint probability of the $i^{th}$ word and $j^{th}$ document, $P(w_i|z_k)$ and $P(d_j|z_k)$ are probabilities of $i^{th}$ word and $j^{th}$ document conditioned on the class $z_k$.

The NTF and T-PLSA techniques are respective multi-way data extensions of the NMF and PLSA techniques used for two-dimensional matrix analyses. The following discussion focuses on three-way data, which does not result in a loss of generality regarding tensors with higher numbers of dimensions. The following discussion is based upon a non-negative three dimensional tensor F defined as: Tensor $F=(f_{ijl})$, where $1 \leq i \leq n$, $1 \leq j \leq m$ and $1 \leq l \leq t$. In one example, Tensor F is a non-negative tensor that can be viewed as a document—word—time co-occurrence tensor or, for instance, a sender—receiver—time tensor with the number of emails from a particular sender to a particular receiver in a particular time. In an example of normalizing F by L1-normalization such that: $\Sigma_{ijl} f_{ijl}=1$, where $f_{ijl}$ is the joint probability of $d_i$, $w_j$, and $e_l$.

There are generally two most well-known tensor decomposition models, Parafac and Tucker3. Both of these models try to define a tensor "C" to reconstruct the original tensor F such that Tensor F≈Tensor C. The Parafac Factorization Model with non-negative constraints can be written as:

$$C_1 = US_1 V^T, \quad (1)$$

where $C_1$ is the first frontal slice of Tensor C that is formed by holding the last mode of Tensor C fixed at 1.

Alternatively, Tensor C can be expressed as:

$$c_{ijl} = \Sigma_p u_{ip} v_{jp} s_{lp} \quad (2)$$

where $U \in \Re^{n \times k}$, $V \in \Re^{m \times k}$, $S \Sigma \Re^{\times k}$, where $S_l$ represents a diagonal matrix with the $l^{th}$ row of S on the diagonal, and $u_{ip} \geq 0$, $v_{jp} \geq 0$, and $s_{lp} \geq 0$. Note that this decomposition only allows the same number of factors in each mode. The $i^{th}$ factor in one mode only interacts with the $i^{th}$ factors in other modes (e.g., one-to-one interactions). Rank-1 decomposition is a type of Parafac with orthogonality constraints on components.

The non-negative Tucker3 Factorization Model can be written as:

$$c_{ijl} = \Sigma_{pqr} g_{pqr} u_{ip} v_{jq} s_{lr} \quad (3)$$

where $U \in \Re^{n \times k_1}$, $V \in \Re^{m \times k_2}$, $S \in \Re^{\times k_3}$, and the three dimensional matrix $G \in \Re^{k_1 \times k_2 \times k_3}$. High Order SVD (HOSVD) is also called Tucker3 tensor model with orthogonality constraints on components.

Two types of PLSA extension on multi-way data can be derived by adding more latent factors. The following uses the terms ParaAspect model and TuckerAspect model to relate these models to NParafac and NTucker.

The ParaAspect Factorization Model can be written as:

$$f_{ijl} \cong P(d_i, w_j, e_l) = \Sigma_p P(d_i|x_p) P(w_j|x_p) P(e_l|x_p) P(x_p) \quad (4)$$

where $(x_p | 1 \leq p \leq k)$ are latent class variables/factors, and $P(d_i, w_j, e_l)$ is the joint probability of $d_i$, $w_j$, and $e_l$. $P(d_i|x_p)$, $P(w_j|x_p)$, and $P(e_l|x_p)$ are the probabilities of generating $d_i$, $w_j$, and $e_l$, respectively, when the class $x_p$ is chosen.

The TuckAspect model has a different latent variable model than the ParaAspect model. The TuckAspect model contains several sets of latent factors $(x_p | 1 \leq p \leq k_1)$, $(y_q | 1 \leq q \leq k_2)$, and $(z_r | 1 \leq r \leq k_3)$. Documents, words, and time are generated from different latent factor sets, e.g. $P(d_i|x_p)$, $P(w_j|y_q)$, $P(e_l|z_r)$, respectively. The joint probability of these factors is generated, e.g. $P(x_p, y_q, z_r)$.

The TuckAspect Factorization Model can be written as:

$$f_{ijl} \approx P(d_i, w_j, e_l) = \Sigma P(d_i|x_q) P(w_j|y_q) P(e_i|z_r) P(x_p, y_q, z_r) \quad (5)$$

The NParafac and NTucker models minimize the DL-divergence between the original data and the reconstruction, as is determined by the objective function of the NTF techniques, i.e., $J_{NTF}$, which is defined as:

$$J_{NTF} = \Sigma_{ijl} (f_{ijl} \text{Log}(f_{ijl}/c_{ijl}) - f_{ijl} + c_{ijl}). \quad (6)$$

ParaAspect and TuckAspect maximize the log-likelihood L is given by:

$$L = \Sigma_{ijl} f_{ijl} \text{Log } P(d_i, w_j, e_l) = -J_{T-PLSA}. \quad (7)$$

By adding a minus sign, the ParaAspect and TuckAspect models minimize the objective function $J_{T-PLSA}$.

One embodiment hereof utilizes an observed equivalence of the T-PLSA and NTF tensor factorization techniques to improve factorization performance. The ParaAspect (with DL-divergence objective) and the NParafac, TuckAspect (with DL-divergence objective) and NTucker models are observed to optimize the same objective functions. The factorization of NParafac and the NTucker with column L1-normalization are also observed to be equivalent to that of ParaAspect and TuckAspect, respectively.

T-PLSA models minimize the log-likelihood, given by: $J_{T-PLSA} = -\Sigma_{ijl} f_{ijl} \text{Log } P(d_i, w_j, e_l)$. If a constant $\Sigma_{ijl} f_{ijl} \text{Log } f_{ijl}$ is added, T-PLSA models minimize: $J_{T-PLSA} = \Sigma_{ijl} f_{ijl} \text{Log}(f_{ijl}/P(d_i, w_j, e_l))$. Then, by adding, $\Sigma_{ijl} [P(d_i, w_j, e_l) - f_{ijl}] = \Sigma_{ijl} P(d_i, w_j, e_l) - \Sigma_{ijl} f_{ijl} = 1 - 1 = 0$. Therefore, the T-PLSA models minimize: $J_{T-PLSA} = \Sigma_{ijl} f_{ijl} \text{Log}(f_{ijl}/P(d_i, w_j, e_l)) - f_{ijl} + P(d_i, w_j, e_l)$.

Referring above to the NTF model objective function set forth in Eq. 6, one skilled in this art would appreciated that the above objective function for T-PLSA models is equivalent to the objective functions of NTF models.

Unlike the T-PLSA factorization technique, the NParafac and NTucker factorization models have an infinite number of solutions. Normalization is a way to make the Nparafac and NTucker models invariant. In order to compare NTF and T-PLSA factorization techniques, the following discussion uses L1-normalization for probabilistic formulations. Defining a normalized input tensor such that $\Sigma_{ijl} f_{ijl} = 1$, the following is provided herein to demonstrate that NParafac factorization is equivalent to that of ParaAspect.

The following defines $D^u$, $D^s$, and $D^v$ as square diagonal matrices with entries $d^u_{jj}$, $d^s_{jj}$, and $d^v_{jj}$ defined by $\Sigma_i u_{ij}$, $\Sigma_l s_{lj}$, and $\Sigma_i v_{ij}$, respectively. This is given by: $U\hat{} = U(D^u)^{-1}$, $S\hat{} = S(D^S)^{-1}$, and $V\hat{} = V(D^V)^{-1}$, where $U\hat{}$, $S\hat{}$, and $V\hat{}$ are denoted as the column L1-normalized matrices of the matrices U, S, and V, respectively.

Nparafac factorization can be written as: $F_l = U\hat{} S_1\hat{} H V\hat{}^T$, or, alternatively:

$$f_{ijl} = \Sigma_p h_{pp} u\hat{}_{ip} v\hat{}_{jp} s\hat{}_{lp} \quad (8)$$

where H is a diagonal matrix such that that matrix $H = D^u D^S D^V$. This factorization equation is equivalent to the factorization equation for the ParaAspect model described above in Eq. 4 such that $u\hat{}_{ip} = P(d_i|x_p)$, $s\hat{}_{lp} = P(e_l|x_p)$, $v\hat{}_{jp} = P(w_j|x_p)$, and $H_{pp} = P(x_p)$. Similar to T-PLSA, resulted $\Sigma_i u\hat{}_{ip} = 1$, $\Sigma_j v\hat{}_{jp} = 1$, $\Sigma_l S\hat{}_{lp} = 1$, from the column L1-normalization. Moreover, $\Sigma_p h_{pp} = 1$, because $\Sigma_{ijl} f_{ijl} = 1 = \Sigma_{ijlp} h_{pp} u\hat{}_{ip} v\hat{}_{jp} s\hat{}_{lp} = \Sigma_p h_{pp}$.

The NTucker Factorization Model of Eq. 3 can be written as:

$$F_{(1)} = UG_{(1)}(S \otimes V)^T \quad (9)$$

where $F_{(1)}$ is F matricized on the first mode and $G_{(1)}$ is the first frontal slice of the three-way array G formed by holding the last mode of the multi-way array G fixed at 1. The symbol "⊗" denotes the Kronecker product of S and V, where: $S \in \Re^{a \times b}$, $V \in \Re^{c \times d}$, and the Kronecker product is a matrix: $C \in \Re^{ac \times bd}$, where each entry is the product of two entries from S and V, respectively.

Defining $D^u$, $D^s$, and $D^v$ similarly as the diagonal matrices with entries being column summation values of U, S, V. $U\hat{}$, $S\hat{}$, and $V\hat{}$ are defined to be normalized versions of U, S, and V. Reformulating Eq. 9 as: $F_{(1)} = U\hat{} H_{(1)} (S\hat{} \Re V\hat{})^T$, where $H_{(1)} = D^u G_{(1)} (D^S \otimes V\hat{})$, allows Eq. 9 to be written in the same factorization formulae as the TuckAspect model of Eq. 5. Let $F_{(1)} = O$.

$$f_{ijl} = \Sigma_{pqr} h_{pqr} u\hat{}_{ip} v\hat{}_{jq} s\hat{}_{lr} \quad (10)$$

Similar to the observed equivalence described above for the Nparafac and ParaAspect models, $\Sigma_i u\hat{}_{ip} = 1$, $\Sigma_j v\hat{}_{jq} = 1$, $\Sigma_l S\hat{}_{lr} = 1$, $\Sigma_{pqr} h_{pqr} = 1$. Thus, $u\hat{}_{ip} = P(d_i|x_p)$, $v\hat{}_{jq} = P(w_j|y_q)$, $s\hat{}_{lp} = P(e_l|z_r)$, $h_{pqr} = P(x_p, y_q, z_r)$.

Although T-PLSA and NTF are equivalent in terms of the objective functions and factorization, they each comprise different algorithms. The following compares algorithms of T-PLSA and NTF.

Non-negative Parafac and Tucker3 use multiplicative update rules to alternatively update components by minimizing the DL-divergence. For updating the component matrix U in non-negative Parafac, let:

$$Z=(S \odot V)^T, \quad (11)$$

where $\odot$ denotes a Khatri-Rao product, $S \odot V = s_1 \otimes v_1, s_2 \otimes v_2, \ldots, s_k \otimes v_k$], $\backslash s_n$ and $v_n$ each denote the $n^{th}$ column of matrix S and V, respectively, and the S and V matrices have the same number of columns.

Given the above definitions, we have:

$$u_{ip} = u_{ip}(\Sigma_j z_{pj} o_{ij}/(UZ)_{ij})/\Sigma_j z_{pj}. \quad (12)$$

Other components of NParafac are updated by matricizing F on the other modes, and Z is changed to be: $(S \odot U)^T$ and $(V \odot U)^T$, respectively. These components are then updated according to Eq. 12.

The component matrix U in non-negative Tucker3 is updated according to Eq. 12 with the following definition of Z:

$$Z=((S \otimes V)G_{(1)}{}^T)^T. \quad (13)$$

Other components are solved by matricizing F and G on the other modes. Z is changed to be: $((S \otimes U) G_{(2)}{}^T)^T$ and $((S \otimes U) G_{(3)}{}^T)^T$. G is a close form solution such that: $G_{(1)} = U^T X_{(1)} ((S \otimes V))$.

ParaAspect and TuckAspect use the standard Expectation Maximization (EM) algorithm to maximize log-likelihood functions. It should be appreciated that the EM algorithm is an established approach to maximize log-likelihood of latent class models. In the Expectation step, posterior probabilities of latent variables are computed based upon the current parameters.

For ParaAspect, the posterior probability is given by:

$$P(x \mid d, w, e) = \frac{P(x)P(d \mid x)P(w \mid x)P(s \mid x)}{\sum_x (P(x)P(d \mid x)P(w \mid x)P(e \mid x))}. \quad (14)$$

For TuckAspect, the posterior probability is given by:

$$P(x, y, z \mid d, w, e) = \frac{P(x, y, z)P(d \mid x)P(w \mid y)P(s \mid z)}{\sum_{x,y,z} (P(x, y, z)P(d \mid x)P(w \mid y)P(s \mid z))} \quad (15)$$

In a Maximization step, the parameters are estimated based on the computed posterior probabilities of the latent variables and the original input tensor. For example P(d|x) is updated for ParaAspect as following $$P(d \mid z) = \frac{\sum_{w,e} f_{d,w,e} P(x \mid d, w, e)}{\sum_{d,w,e} f_{d,w,e} P(x \mid d, w, e)} \quad (16)$$

The updating algorithms for ParaAspect and TuckAspect are known to practitioners of ordinary skill in the relevant arts and are described in, for example, J. Sun, H. Zeng, H. Liu, Y. Lu and Z. Chan entitled: *"Cubesvd: A Novel Approach To Personalized Web Search"*, Proceedings of the 14$^{th}$ International Conference on World Wide Web, (2005), and in Y. Chi, S. Zhu, Y. Gong, and Y. Zhang, entitled: *"Probabilistic Polyadic Factorization And Its Application To Personalized Recommendation"*, CIKM '08: Proceedings of the 17$^{th}$ ACM Conference on Information and Knowledge Management, pages 941-950. ACM (2008). The preceding references are hereby incorporated herein by reference.

From the above, three differences can be seen between NTF and T-PLSA. These are as follows. A first difference is that NTF updates one component by fixing other components, and updated component are subsequently used to update the other components. In contract, however, T-PLSA updates components only based on the posterior probability of the latent variables. A second difference is that NParafac and ParaAspect have the same computational complexity, which is O(mntk) where the function O(x) denotes an order of complexity "x." On the other hand, TuckAspect has a larger computational complexity of $O(nmtk_1k_2k_3)$ than NTucker with $O(mtk_1k_2k_3+nmtk_1)$, or $O(nmtk_1)$ when $n \gg k_2k_3$. A third difference is that, even though NParafac and ParaAspect have the same computational complexity, ParaAspect requires more space for calculating the posterior probabilities of the latent variables. ParaAspect requires O(mntk) number of space units (if saving all entries). NParafac only requires O(nmt) with $k \ll \min(n,m,t)$. TuckAspect requires $O(nmtk_1k_2k_3)$ space units while NTucker only needs $O(nmt+ mtk_2k_3+ntk_1k_3+nmk_1k_2)$ space units, or O(nmt) when $n \gg k_2k_3$, $m \gg k_1k_3$, and $t \gg k_1k_2$. As such, NTF and T-PLSA have different algorithms to solve their models, and NTF requires less computation and space than T-PLSA. The above illustrates that two types of T-PLSA models are equivalent to non-negative Parafac and Tucker3 by showing that they have equivalent objective functions and factorizations. The NTF and T-PLSA models optimize equivalent objective functions and also have an equivalent factorization. However, these two techniques have different algorithms and are therefore likely to converge to different local minima.

Various Embodiments

Figure 3:
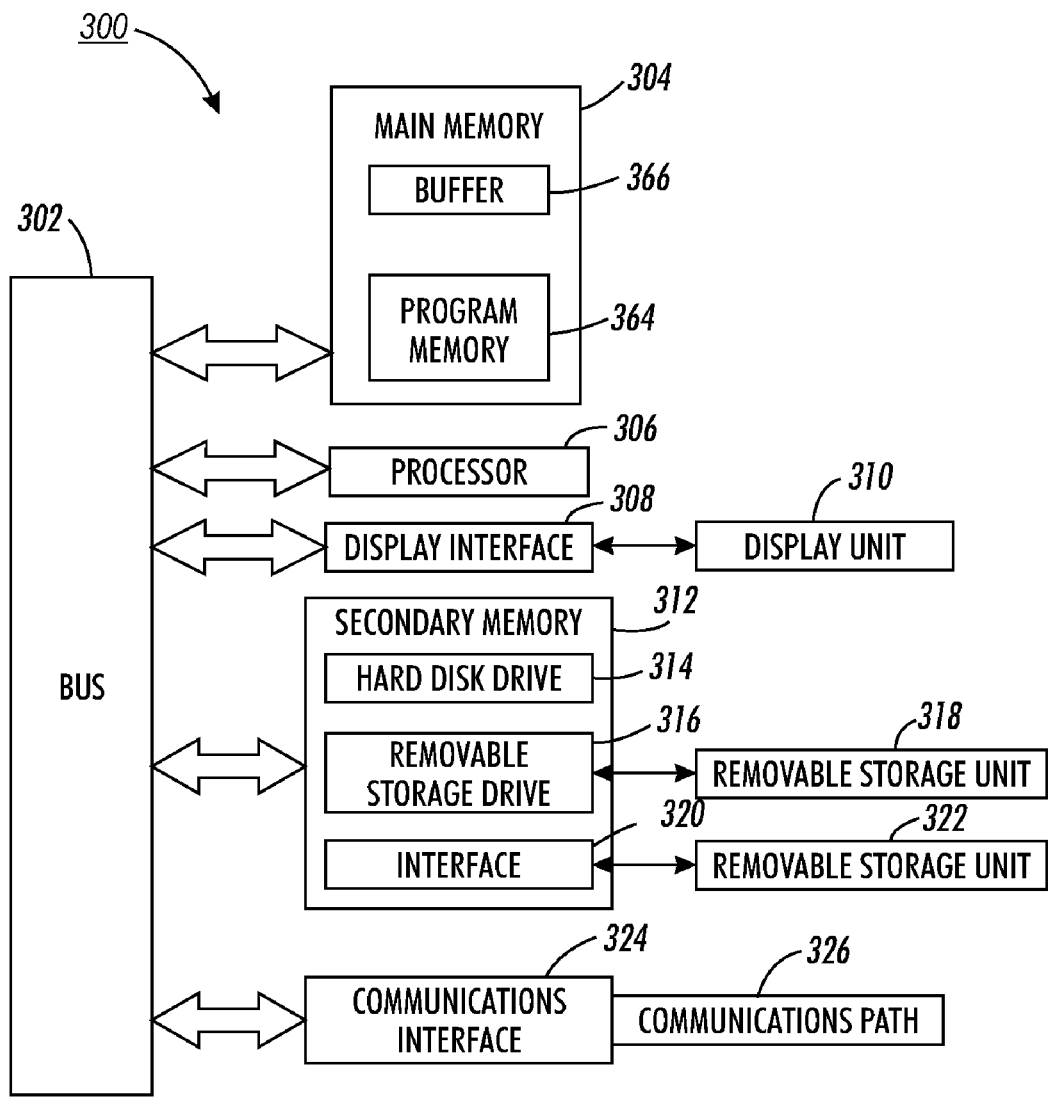
FIG. 3 illustrates a block diagram of one example embodiment of a special purpose computer useful for implementing one or more aspects of the present method.

Reference is now made to FIG. 3 which illustrates a block diagram of one example embodiment of a special purpose computer useful for implementing one or more aspects of the present method. Such a system could be implemented as a separate computer system, an electronic circuit, or an ASIC, for example. The nature of the implementation will depend on the processing environment wherein the present method finds its intended uses. The special purpose computer system would execute machine readable program instructions for performing various aspects of the present method as described in FIG. 1 and the flow diagram of FIG. 2.

Special purpose computer system 300 includes processor 306 for executing machine executable program instructions for carrying out all or some of the present method. The processor is in communication with bus 302. The system includes main memory 304 for storing machine readable instructions. Main memory may comprise random access memory (RAM) to support reprogramming and flexible data storage. Buffer 366 stores data addressable by the processor. Program memory 364 stores machine readable instructions for performing the present method. A display interface 308 forwards data from bus 302 to display 310. Secondary memory 312 includes a hard disk 314 and storage device 316 capable of reading/writing to removable storage unit 318, such as a floppy disk, magnetic tape, optical disk, etc. Secondary memory 312 may further include other mechanisms for allowing programs and/or machine executable instructions to be loaded onto the processor. Such mechanisms may include, for example, a storage unit 322 adapted to exchange data through interface 320 which enables the transfer of software and data. The system includes a communications interface 324 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 326 which carries such signals and may be implemented using wire, cable, fiber optic, phone line, cellular link, RF, memory, or other means known in the arts.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for carrying instructions and/or data to the computer system or device. Such computer program products may include non-volatile memory, such as a floppy disk, hard drive, memory, ROM, RAM, flash memory, disk memory, and other storage useful for transporting machine readable program instructions for executing the present method. It may further include a CD-ROM, DVD, tape, cassette, or other digital or analog media, capable of having embodied thereon one or more logical programming instructions or other machine executable codes or commands that implement and facilitate the function, capability, and methods disclosed herein.

It should be understood that the flow diagrams hereof are intended to be illustrative. Other operations may be added, modified, enhanced, or consolidated. Variations thereof are intended to fall within the scope of the appended claims.

It should be understood that one or more aspects of the present method are intended to be incorporated in an article of manufacture, including one or more computer program products. The article of manufacture may be included on a storage device readable by a machine architecture, xerographic system, color management or other image processing system, any of which capable of executing program instructions containing the present method. Such an article of manufacture may be shipped, sold, leased, or otherwise provided separately either alone or as part of an add-on, update, upgrade, download, or product suite by the assignee or a licensee hereof as part of a computer system, xerographic system, document processing system, image processing system, color management system, operating system, software program, plug-in, DLL, or a storage device.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for identifying clusters within data sets in a document processing system, the method comprising:
    receiving, from an electronic document storage system, a plurality of digital documents for which multi-dimensional probabilistic relationships are to be determined;
    parsing, with a computer processor, the plurality of digital documents to identify multi-dimensional count data within each of the plurality of digital documents, the multi-dimensional count data comprising at least three dimensions with each dimension comprising a respective data class comprising one of metadata associated with a respective document and text within a respective document;
    producing a data set comprising at least a three dimensional tensor representing the multi-dimensional count data;
    defining cluster definition matrices comprising estimated cluster membership probability of each element of each dimension of the multi-dimensional count data within the data set, the estimated cluster membership probability indicating a probability of membership of each element in a respective data cluster;
    setting the cluster definition matrices to current cluster definition matrices comprising random entry values for the data set;
    setting a pre-defined convergence criteria for iterative cluster definition refinement processing;
    setting the first tensor factorization model to any one of a NParafac Factorization Model and a NTucker3 Tensor Decomposition Model;
    setting the second tensor factorization models to a complementary model of the first tensor factorization model, the complementary model selected from one of a ParaAspect Factorization Model and a TuckAspect Tensor Decomposition Model,
    wherein the first tensor factorization model and the second factorization model each have respective objective functions that are equivalent to one another, and
    wherein the first tensor factorization model and the second factorization model each use respective optimization algorithms that are different from one another to solve their equivalent respective objective functions;
    iteratively processing the current cluster definition matrices with a sequence of iterations to produce a sequence of current cluster definition matrices, the iteratively processing being performed until the convergence criteria has been satisfied, the iteratively processing comprising:
        processing the data set and the current cluster definition matrices using a first one of any of the first tensor factorization model and the second tensor factorization model to produce an updated cluster definition matrices, the processing the data set and the current cluster definition matrices using the first one operating to optimize an objective function of the first one; and
        processing the data set and the updated cluster definition matrices using a second one of the first tensor factorization model and the second tensor factorization model, the processing the data set and the updated cluster definition matrices using the second one operating to optimize an objective function of the second one, the second one being different than the first one of the first tensor factorization model and the second tensor factorization model,
            the processing the data set and the updated cluster definition matrices using the second one operating to refine the updated cluster definition matrices that are the results of the first tensor factorization model,
            the processing the data set and the updated cluster definition matrices using the second one producing a new current cluster definition model to be processed by the first tensor factorization model during a subsequent iteration, and
wherein the data set is unchanged during the iterative processing;
determining at least one likely cluster membership for any of the multi-dimensional count data within the data set based upon refinements made to the cluster definition matrices, a likely cluster membership comprising an indicator of membership of an element of the multi-dimensional count data in a respective cluster; and
outputting the at least one likely cluster membership.

2. The method of claim 1, wherein the first tensor factorization model comprises the NParafac Factorization Model and the second tensor factorization model comprises the ParaAspect Factorization Model.

3. The method of claim 1, wherein the first tensor factorization model comprises the NTucker3 Tensor Decomposition Model and the second tensor factorization model comprises the TuckAspect Tensor Decomposition Model.

4. The method of claim 1, wherein parsing the plurality of digital documents to identify multi-dimensional count data within each of the plurality of digital documents comprises performing one of data mining and text mining on each digital document within the plurality of digital documents.

5. The method of claim 1, wherein producing a data set comprising at least a three dimensional tensor representing the multi-dimensional count data comprises:
categorizing the multi-dimensional count data into at least three categories; and
populating the at least three dimensional tensor within the data set with the multi-dimensional count data, wherein each category within the at least three categories populates a respective dimension of the at least three dimensional tensor within the data set.

6. The method of claim 1, wherein determining at least one likely cluster membership for any of the multi-dimensional count data within the data set based upon refinements made to the cluster definition matrices comprises determining a highest probability of cluster membership for the any of the multi-dimensional count data.

7. The method of claim 1, further comprising scanning, prior to the receiving, a plurality of printed documents into the electronic document storage system.

8. The method of claim 1, further comprising:
crawling, prior to the receiving, a plurality of electronic documents available over a computer network; and
storing the plurality of electronic documents into the electronic document storage system.

9. A system for identifying clusters within data sets in a document processing system, the system comprising:
a memory;
a storage medium for storing data; and
a processor in communication with said storage medium and said memory, said processor executing machine readable instructions for performing the method of:
receiving, from an electronic document storage system, a plurality of digital documents for which multi-dimensional probabilistic relationships are to be determined;
parsing, with a computer processor, the plurality of digital documents to identify multi-dimensional count data within each of the plurality of digital documents, the multi-dimensional count data comprising at least three dimensions with each dimension comprising a respective data class comprising one of metadata associated with a respective document and text within a respective document;
producing a data set comprising at least a three dimensional tensor representing the multi-dimensional count data;
defining cluster definition matrices comprising estimated cluster membership probability of each element of each dimension of the multi-dimensional count data within the data set, the estimated cluster membership probability indicating a probability of membership of each element in a respective data cluster;
setting the cluster definition matrices to current cluster definition matrices comprising random entry values for the data set;
setting a pre-defined convergence criteria for iterative cluster definition refinement processing;
setting the first tensor factorization model to any one of a NParafac Factorization Model and a NTucker3 Tensor Decomposition Model;
setting the second tensor factorization models to a complementary model of the first tensor factorization model, the complementary model selected from one of a ParaAspect Factorization Model and a TuckAspect Tensor Decomposition Model,
wherein the first tensor factorization model and the second factorization model each have respective objective functions that are equivalent to one another, and
wherein the first tensor factorization model and the second factorization model each use respective optimization algorithms that are different from one another to solve their equivalent respective objective functions;
iteratively processing the current cluster definition matrices with a sequence of iterations to produce a sequence of current cluster definition matrices, the iteratively processing being performed until the convergence criteria has been satisfied, the iteratively processing comprising:
processing the data set and the current cluster definition matrices using a first one of any of the first tensor factorization model and the second tensor factorization model to produce an updated cluster definition matrices, the processing the data set and the current cluster definition matrices using the first one operating to optimize an objective function of the first one; and
processing the data set and the updated cluster definition matrices using a second one of the first tensor factorization model and the second tensor factorization model, the processing the data set and the updated cluster definition matrices using the second one operating to optimize an objective function of the second one, the second one being different than the first one,
the processing the data set and the updated cluster definition matrices using the second one operating to refine the updated cluster definition matrices that are the results of the first tensor factorization model,
the processing the data set and the updated cluster definition matrices using the second one producing a new current cluster definition model to be processed by the first tensor factorization model during a subsequent iteration, and
wherein the data set is unchanged during the iterative processing;
determining at least one likely cluster membership for any of the multi-dimensional count data within the data set based upon refinements made to the cluster definition matrices, a likely cluster membership comprising an indicator of membership of an element of the multi-dimensional count data in a respective cluster; and outputting the at least one likely cluster membership.

10. The system of claim 9, wherein the first tensor factorization model comprises the NParafac Factorization Model and the second tensor factorization model comprises the ParaAspect Factorization Model.

11. The system of claim 9, wherein the first tensor factorization model comprises the NTucker3 Tensor Decomposition Model and the second tensor factorization model comprises the TuckAspect Tensor Decomposition Model.

12. The system of claim 9, wherein parsing the plurality of digital documents to identify multi-dimensional count data within each of the plurality of digital documents comprises performing one of data mining and text mining on each digital document within the plurality of digital documents.

13. The system of claim 9, wherein producing a data set comprising at least a three dimensional tensor representing the multi-dimensional count data comprises:
   categorizing the multi-dimensional count data into at least three categories; and
   populating the at least three dimensional tensor within the data set with the multi-dimensional count data, wherein each category within the at least three categories populates a respective dimension of the at least three dimensional tensor within the data set.

14. The system of claim 9, wherein determining at least one likely cluster membership for any of the multi-dimensional count data within the data set based upon refinements made to the cluster definition matrices cluster definition matrices comprises determining a highest probability of cluster membership for the any of the multi-dimensional count data.

15. The system of claim 9, wherein the method further comprises scanning, prior to the receiving, a plurality of printed documents into the electronic document storage system.

16. The system of claim 9, wherein the method further comprises:
   crawling, prior to the receiving, a plurality of electronic documents available over a computer network; and
   storing, prior to the receiving, the plurality of electronic documents into the electronic document storage system.

17. A method for identifying clusters within data sets in a document processing system, the method comprising:
   receiving, from an electronic document storage system, a plurality of digital documents for which multi-dimensional probabilistic relationships are to be determined;
   parsing, with a computer processor, the plurality of digital documents to identify multi-dimensional count data within each of the plurality of digital documents, the multi-dimensional count data comprising at least three dimensions with each dimension comprising a respective data class comprising one of metadata associated with a respective document and text within a respective document;
   categorizing the multi-dimensional count data into at least three categories;
   producing a data set comprising at least a three dimensional tensor representing the multi-dimensional count data;
   defining cluster definition matrices comprising estimated cluster membership probability of each element of each dimension of the multi-dimensional count data within the data set, the estimated cluster membership probability indicating a probability of membership of each element in a respective data cluster;
   populating the at least three dimensional tensor within the data set with the multi-dimensional count data, wherein each category within the at least three categories populates a respective dimension of the at least three dimensional tensor within the data set;
   setting the cluster definition matrices to current cluster definition matrices comprising random entry values for the data set;
   setting a pre-defined convergence criteria for iterative cluster definition refinement processing;
   iteratively processing the current cluster definition matrices with a sequence of iterations to produce a sequence of current cluster definition matrices, the iteratively processing being performed until the convergence criteria has been satisfied, the iteratively processing comprising:
      processing the data set and the cluster definition matrices using any one of a NParafac Factorization Model and a NTucker3 Tensor Decomposition model to produce an updated cluster definition matrices by using a first optimization algorithm to optimize a first objective function of the any one of the NParafac Factorization Model and the NTucker3 Tensor Decomposition Model; and
      processing the data set and the updated cluster definition matrices using a complementary model of the first tensor factorization model, the complementary model selected from one of a ParaAspect Factorization Model and a TuckAspect Tensor Decomposition Model by using a second optimization algorithm to optimize a second objective function of the complementary model,
      wherein the first objective function is equivalent to the second objective function, and
      wherein the first optimization algorithm and the second optimization algorithm are different from one another;
   determining at least one likely cluster membership for any of the multi-dimensional count data within the data set based upon refinements made to the cluster definition matrices, a likely cluster membership comprising an indicator of membership of an element of the multi-dimensional count data in a respective cluster; and
   outputting the at least one likely cluster membership.

18. The method of claim 17, further comprising scanning, prior to the receiving, a plurality of printed documents into the electronic document storage system.

19. The method of claim 17, further comprising:
   crawling, prior to the receiving, a plurality of electronic documents available over a computer network; and
   storing, prior to the receiving, the plurality of electronic documents into the electronic document storage system.

* * * * *